（12）United States Patent
Sasage et al.

(10) Patent No.: US 7,971,673 B2
(45) Date of Patent: Jul. 5, 2011

(54) SADDLE-RIDE TYPE ELECTRIC VEHICLE

(75) Inventors: Taiki Sasage, Saitama (JP); Masahiko Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/567,247

(22) Filed: Sep. 25, 2009

(65) Prior Publication Data

US 2010/0078247 A1  Apr. 1, 2010

(30) Foreign Application Priority Data

Sep. 30, 2008 (JP) ................. 2008-255162

(51) Int. Cl.
B62D 61/02 (2006.01)
(52) U.S. Cl. ................. 180/220; 180/65.1; 180/68.5
(58) Field of Classification Search .................. 180/219, 180/221, 65.1, 68.5
See application file for complete search history.

(56) References Cited

FOREIGN PATENT DOCUMENTS

| GB | 2 307 218 A | 5/1997 |
| JP | 5-105145 A | 4/1993 |
| JP | 5-105147 A | 4/1993 |
| JP | 2003-182669 A | 7/2003 |

*Primary Examiner* — Joanne Silbermann
*Assistant Examiner* — Tashiana Adams
(74) *Attorney, Agent, or Firm* — Birch, Stewart, Kolasch & Birch, LLP

(57) ABSTRACT

A saddle-ride type electric vehicle includes an electric motor for generates power for rotationally driving a rear wheel. Foot rests are provided for an occupant seated on an occupant seat. A battery is disposed in a space S surrounded by a down frame which is coupled to a head pipe or to a front end of a main frame and which extends downwardly, pivot frames, and the main frame. Steps disposed to both sides of the battery in planar view are provided to front ends of a pair of left and right step frames coupled to lower portion of the pivot frames, the step frames extending forward and overlapping a rear portion of the battery in planar view. The battery is wider in an area adjacent to the head pipe as compared to the width of the battery in an area adjacent to the steps.

18 Claims, 6 Drawing Sheets

SADDLE-RIDE TYPE ELECTRIC VEHICLE

CROSS-REFERENCE TO RELATED APPLICATIONS

The present application claims priority under 35 USC 119 to Japanese Patent Application No. 2008-255162 filed on Sep. 30, 2008 the entire contents of which are hereby incorporated by reference.

BACKGROUND OF THE INVENTION

1. Field of the Invention

The present invention relates to a saddle-ride type electric vehicle including a head pipe steerably supporting a front fork with a lower end that journals a front wheel and a steering handlebar. A main frame extends rearwardlyly and downwardlyly from the head pipe. An electric motor is provided for generating power for rotationally driving a rear wheel.

2. Description of Background Art

A motorcycle in which a battery supplying electric power to an electric motor is disposed below a main frame extending rearwardly and downwardly from a head pipe is known, for example, as set forth in JP-A No. 2003-182669.

However, in the motorcycle disclosed in JP-A No. 2003-182669, a motor unit having an electric motor generating power for rotationally driving a rear wheel is mounted between a lower portion of a front bracket suspending from the main frame and lower portions of pivot frames extending downwardly from a rear end of the main frame. Since batteries are disposed to a narrow space between the motor unit and the main frame, it is difficult to dispose many batteries.

SUMMARY AND OBJECTS OF THE INVENTION

The present invention is made in view of such a situation. An object of an embodiment of the present invention is to provide a saddle-ride type electric vehicle in which, a foot rest is provided for an occupant seated on an occupant seat while the maintainability of a battery is improved. Thus, a large battery is capable of used.

To achieve the above object according to an embodiment of the present invention, a saddle-ride type electric vehicle includes a head pipe steerably supporting a front fork with a lower end that journals a front wheel and a steering handlebar. A main frame extends rearwardly and downwardly from the head pipe. An electric motor is provided for generating power for rotationally driving a rear wheel. The electric motor is disposed to a position different from a space surrounded by a down frame which is coupled to the head pipe or to the front end of the main frame and which extends downwardly. Pivot frames are coupled to the rear end of the main frame and extend downwardly from the main frame. A battery supplying electric power to the electric motor is disposed in the space. Steps for resting the feet of an occupant seated on an occupant seat are provided to the front ends of a pair of left and right step frames coupled to the lower portion of the pivot frames. The step frames extend forward and overlap the rear portion of the battery in a planar view. The steps are disposed to both sides of the battery in a planar view. A bottom surface of the battery is stepped down in a forward direction. The bottom surface includes a rear bottom surface disposed above the step frames and the steps in side view and a front bottom surface disposed between the steps and the down frame and below the step frames and the steps.

In the invention according to an embodiment of the present invention, multiple battery cells coupled to each other to form the battery are arranged in a battery box which has an upper surface extending rearwardly and downwardly along the main frame and which is disposed in a space surrounded by the main frame, the down frame, and the pivot frames, the battery cells conforming to a shape of the battery box.

According to an embodiment of the present invention, a width of a portion of the battery disposed forward of both of the step frames and both of the steps is set larger than a width of a rear portion of the battery corresponding to both of the step frames and both of the steps.

Further, according to an embodiment of the present invention, a lid covering a side of the battery box is provided to a vehicle body cover covering the battery box, the lid being openable and closable.

According to an embodiment of the present invention, the space surrounded by the main frame, the down frame, and the pivot frames is made large by disposing the electric motor to a different position from this space. By disposing a battery in the large space, a large battery is capable of being disposed. Additionally, the steps disposed to both sides of the battery in a planar view are provided to the front ends of the pair of left and right step frames, the front ends overlapping the rear portion of the battery in the planar view. Accordingly, while preventing a width between both step frames from becoming large, the foot rest capability for an occupant is improved. The bottom surface of the battery is stepped down in a forward direction, the bottom surface including the rear bottom surface is disposed above the step frames and the steps in side view and the front bottom surface disposed below the step frames and the steps. While preventing a width between both of the step frames from becoming large, downsizing of the battery is avoidable. Without interfering with the step frames and the steps, the battery is capable of being drawn from the side, improving the maintainability of the battery.

According to an embodiment of the present invention, since multiple battery cells coupled to form the battery are arranged in a battery box to conform to a shape of the battery box, more battery cells are capable of being stored in the battery box.

According to an embodiment of the present invention, a width of a portion of the battery disposed forward of the step frames and the steps is larger than a width of a rear portion of the battery corresponding to the step frames and the steps. Accordingly, the battery is capable of being made large while improving foot rest capability.

Further, according to an embodiment of the present invention, since the battery box is capable of being drawn from the side by opening a lid of a vehicle body cover, maintainability of the battery is capable of being improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the invention is explained below based on embodiments of the present invention shown in the appended drawings.

Figure 1:
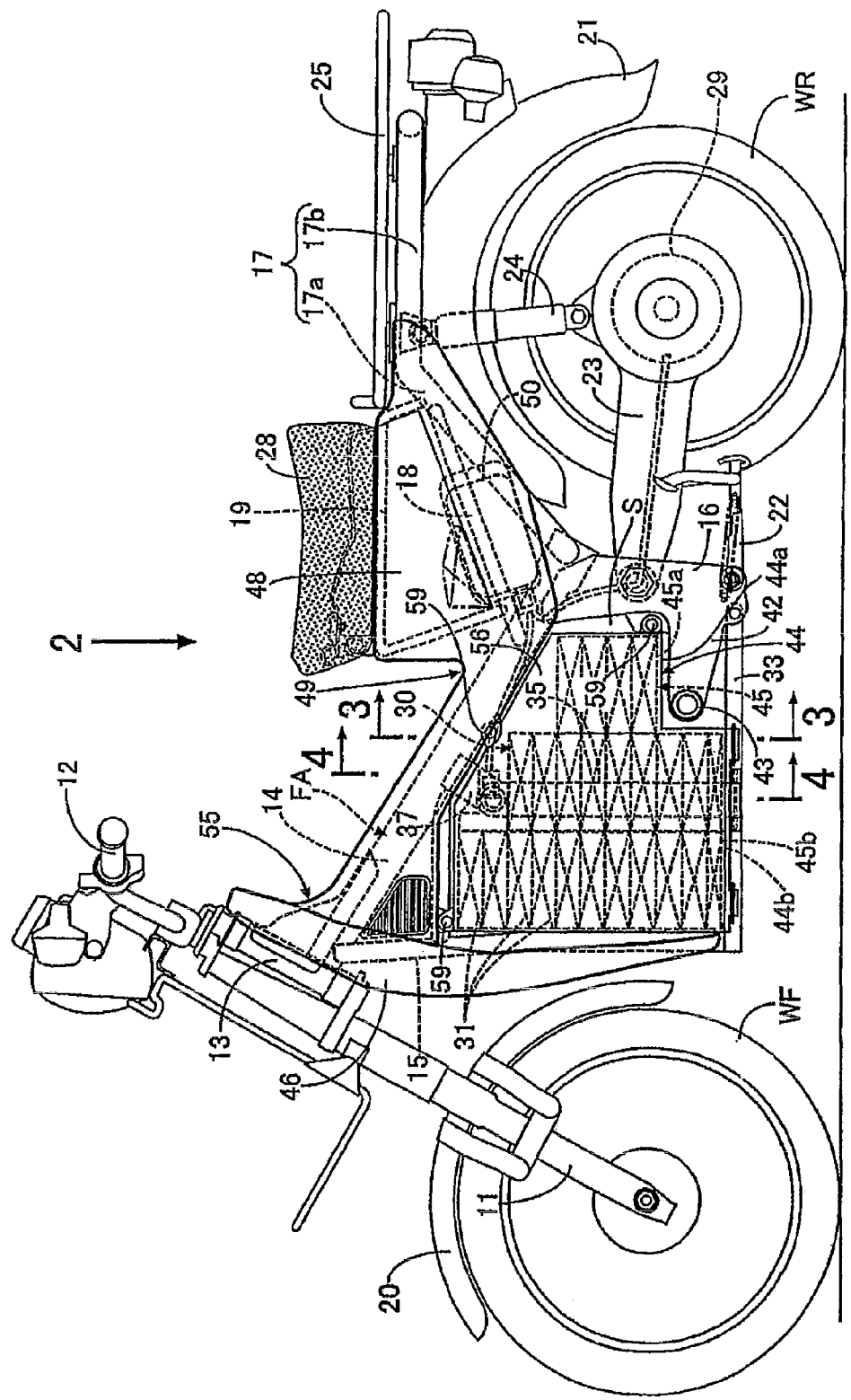
FIG. 1 is a left side view of a motorcycle of a first embodiment.
Figure 2:
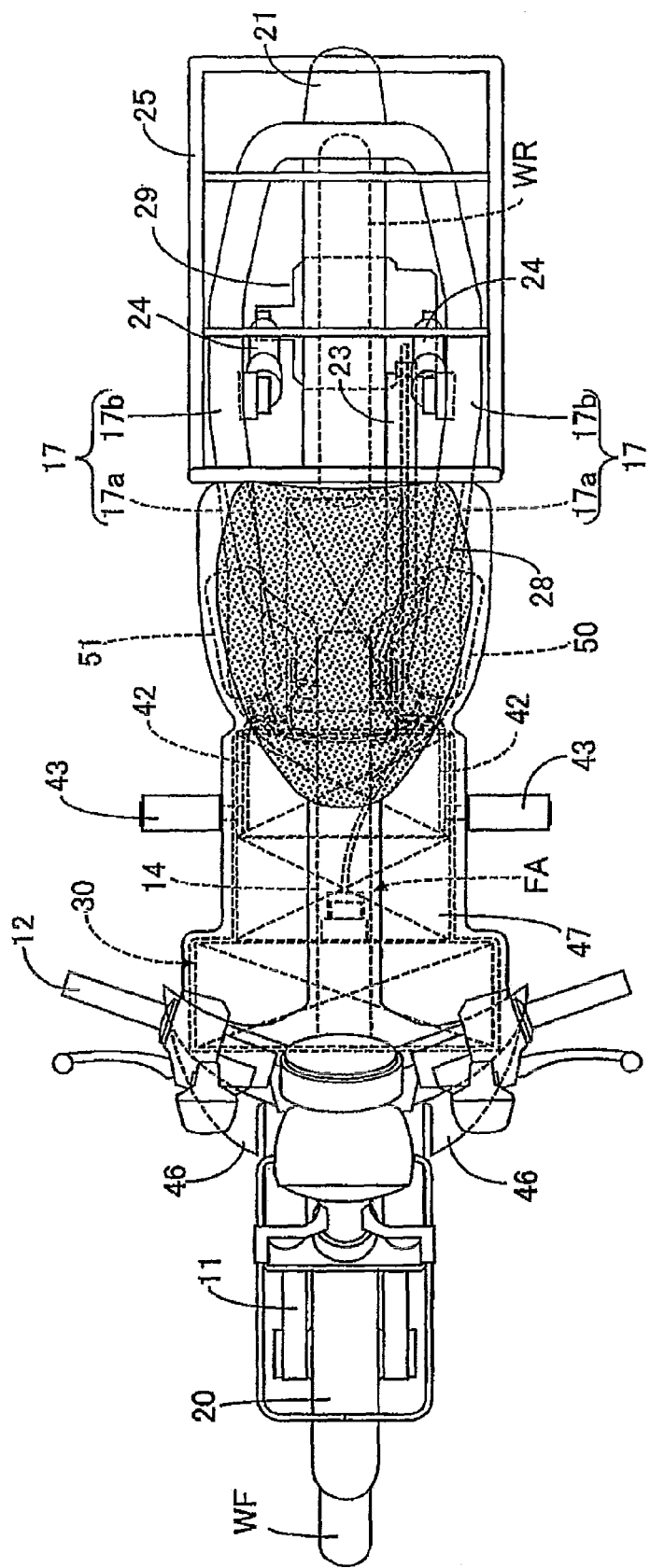
FIG. 2 is a view in a direction of an arrow 2 of FIG. 1.

As illustrated in FIGS. 1 and 2, a vehicle body frame FA includes a head pipe 13 steerably supporting a front fork 11 whose lower end journals a front wheel WF and a steering handlebar 12 which has a bar shape and is coupled to an upper portion of the front fork 11. A main frame 14 has a pipe shape and extends rearwardly and downwardly from the head pipe 13. A pair of left and right pivot frames 16 are coupled to a rear end of the main frame 14 and extend downwardly. A pair of left and right rear frames 17 are coupled to the rear end of the main frame 14 and extend rearwardly. A pair of left and right seat rails are provided between the rear portion of the main frame 14 and both of the rear frames 17 and incline rearwardly and upwardly.

Both of the rear frames 17 integrally include inclined portions 17a which extend rearwardly and upwardly from the rear end of the main frame 14 and horizontal portions 17b which extend rearwardly horizontally from rear ends of the inclined portions 17a. Rear portions of both of the horizontal portions 17b are coupled to one another. Rear ends of the seat rails 18 are coupled to rear upper portions of the inclined portions 17a of the rear frames 17.

A front fender 20 which covers the front wheel WF from the above is attached to the front fork 11. A rear fender 21 which covers a rear wheel WR from above is attached to the rear frames 17. A main stand 22 is pivotally attached to lower portions of the pivot frames 16. In addition, a front end of a swing arm 23 whose rear end journals the rear wheel WR is vertically pivotally coupled to the pivot frames 16. Rear shock absorbers 24 are provided between front portions of the horizontal portions 17b of the rear frames 17 and a rear portion of the swing arm 23. A carrier 25 is provided above the horizontal portions 17b of the rear frames 17.

An occupant seat 28 is disposed forward of the carrier 25. The occupant seat 28 is supported by the seat rails 18 via a seat support frame 19.

The rear wheel WR is rotationally driven by power generated by an electric motor 29. A battery 30 which supplies electric power to the electric motor 29 is disposed in a space S (see FIG. 1) surrounded by the main frame 14, a down frame 15 which forms part of the vehicle body frame FA and which is coupled to the head pipe 13 or to the front end of the main frame 14 (in this embodiment, the front end of the main frame 14), the down frame 15 extending downwardly, and the pivot frames 16. On the other hand, the electric motor 29 is disposed to a different position from the space S. In this embodiment, the electric motor 29 is disposed to the rear end of the swing arm 23. A rotation axis of the electric motor 29 is coaxial with the rear wheel WR.

The battery 30 is structured by coupling multiple battery cells 31 to each other. Each of the battery cells 31 is arranged in a battery box 32 which has an upper surface stepped down generally along the main frame 14 of the vehicle body frame FA and which is disposed in the space S surrounded by the main frame 14, the down frame 15, and the pivot frames 16, the battery cells conforming to a shape of the battery box 32.

Thus, the upper surface of the battery box 32 is formed along the lower surface of the main frame 14 extending rearwardly and downwardly. In this embodiment, the upper surface of the battery box 32 is formed to be stepped down rearwardly.

Figure 3:
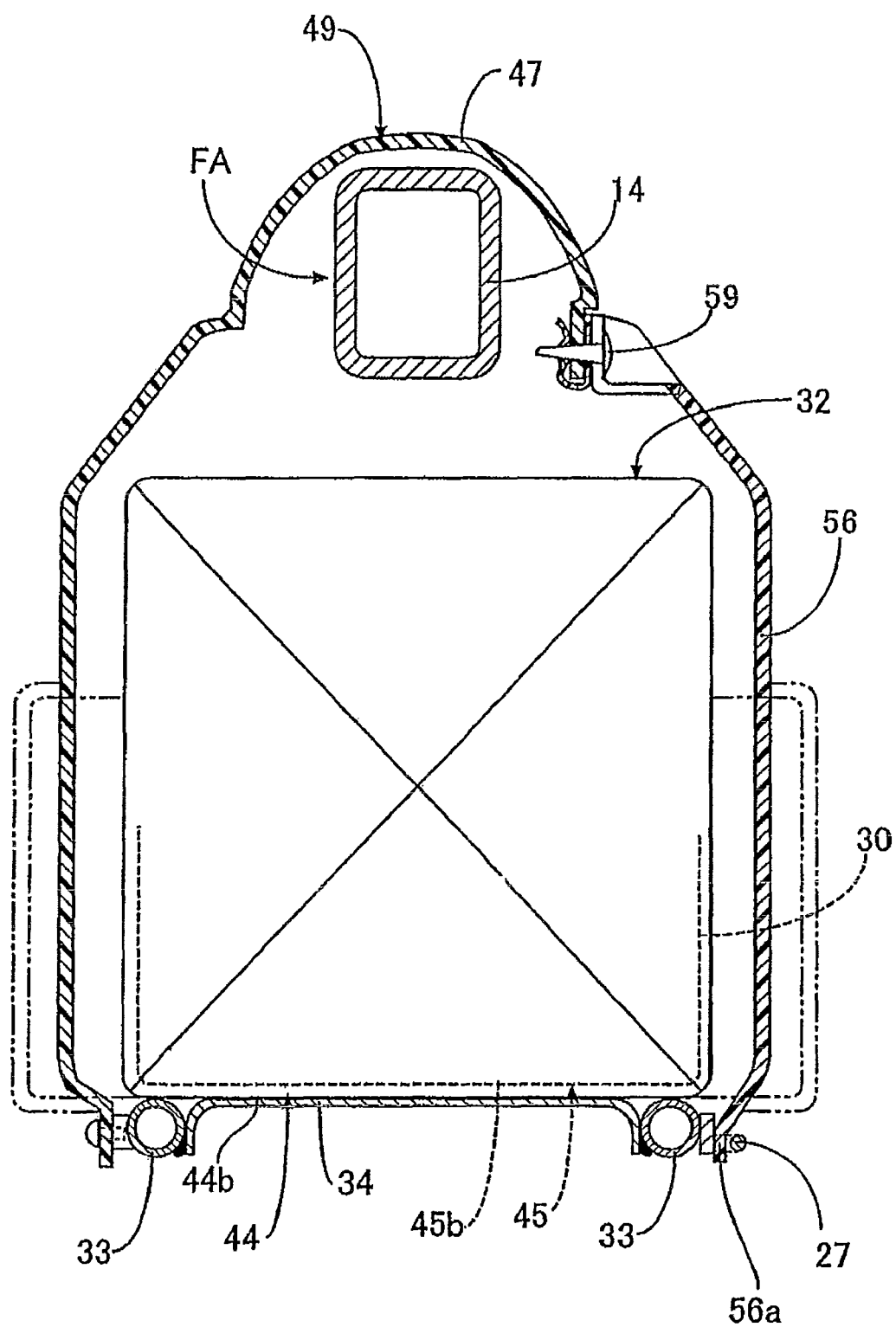
FIG. 3 is a sectional view taken along a line 3-3 of FIG. 1.
Figure 4:
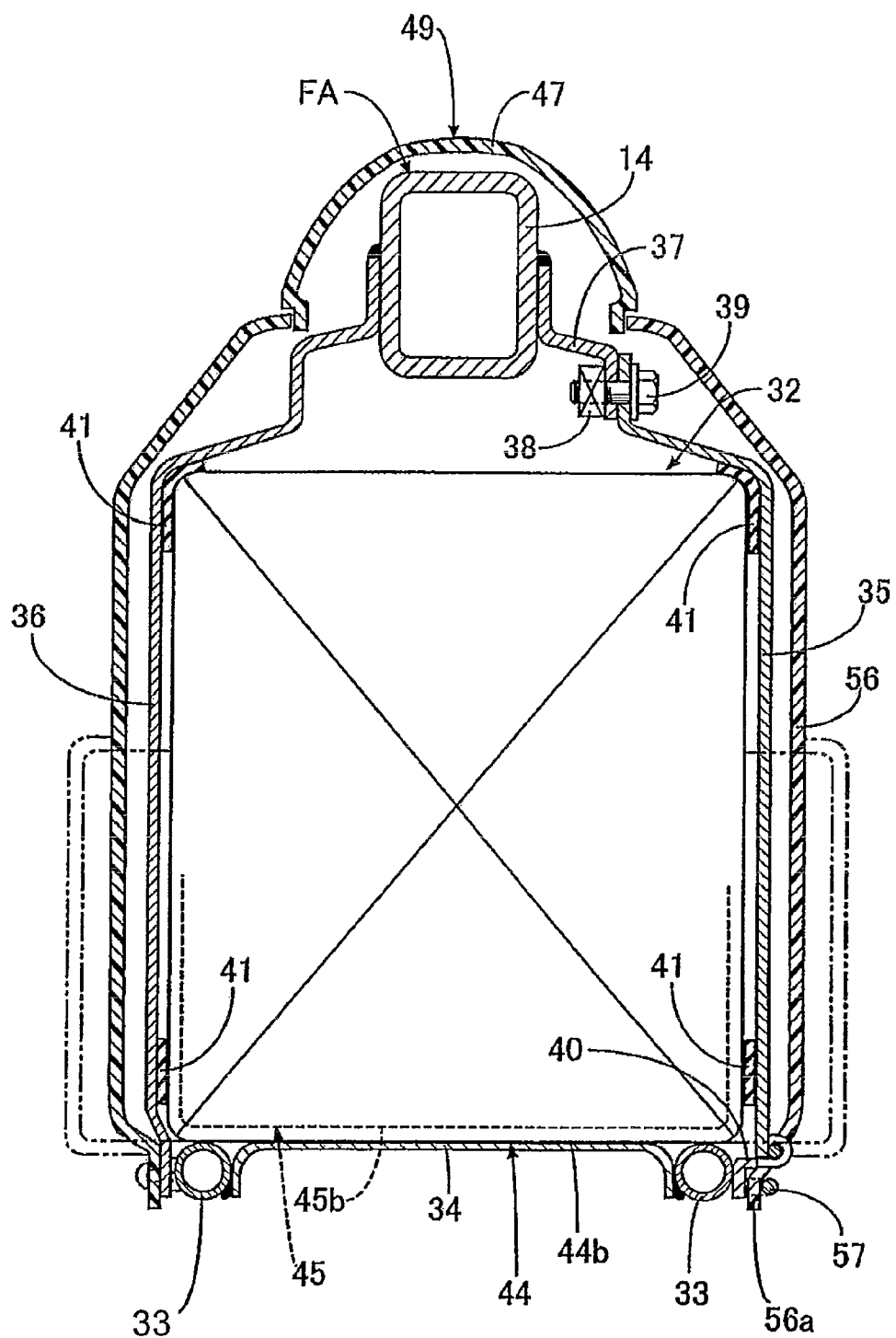
FIG. 4 is a sectional view taken along a line 4-4 of FIG. 1.

Referring to FIGS. 3 and 4 together, a pair of left and right lower frames 33, 33 supporting the battery box 32 by coupling the down frame 15 and the pivot frames 16 to each other are provided between the lower portion of the down frame 15 and the lower portions of the pivot frames 16. Both of the lower frames 33, 33 are coupled to one another by a support plate 34 for mounting the battery box 32.

As clearly shown in FIG. 4, both side surfaces of the battery box 32 are supported by a pair of left and right support frames 35, 36 extending vertically in a longitudinal intermediate portion of the battery box 32. The support frame 36 disposed to the right is provided between the lower frame 33 on the right and the main frame 14. The support frame 35 disposed to the left is provided between a stay 37 secured to the main frame 14 and the lower frame 33 on the left. In addition, elastic members 41, 41 are inserted between both of the support frames 35, 36 and the battery box 32.

Further, the upper end of the left support frame 35 is removably fixed to the stay 37 by screwing a bolt 39 into a nut 38 secured to the stay 37. The lower end of the left support frame 35 is pivotally coupled to a journal member 40 secured to the lower frame 33 on the left. Therefore, when fixation of the support frame 35 to the stay 37 is released by loosening the bolt 39, the support frame 35 is capable of pivoting downwardly.

A pair of left and right step frames 42, 42 extending forward from the pivot frames 16 are coupled to the lower portions of the pivot frames 16. Steps 43, 43 for resting the feet of an occupant seated on the occupant seat 28 are provided to the front ends of the step frames 42. Additionally, both of the step frames 42 are disposed to a position overlapping the rear portions of the battery 30 and of the battery box 32 in a planar view. The steps 43 are disposed on both sides of the battery 30 and the battery box 32 in a planar view.

A bottom surface 44 of the battery box 32 is stepped down forward by including a rear bottom surface 44a disposed above the step frames 42 and the steps 43 in a side view and a front bottom surface 44b disposed below the step frames 42 between the steps 43 and the down frame 15. A bottom surface 45 of the battery 30 is also stepped down forward by including a rear bottom surface 45a disposed above the step frames 42 and the steps 43 in side view and a front bottom surface 45b disposed below the step frames 42 and the steps 43 between the steps 43 and the down frame 15.

In addition, a width of the rear portion of the battery box 32 containing the battery 30 is set smaller than a width of the front portion of the battery box 32.

In addition, left and right legs of an occupant seated on the occupant seat 28 are both covered by leg shields 46 from the front. The leg shields 46 are integrally provided to a center cover 47 made of synthetic resin and covering the front portion of the battery box 32 from both sides. On the other hand, the seat rails 18 and the seat support frame 19 are covered, from both sides, with a pair of left and right side covers 48 disposed below the occupant seat 28 and made of synthetic resin. The side covers 48 made of synthetic resin are coupled to the center cover 47, and forms the vehicle body cover 49 together with the center cover 47.

Further, drive circuit means 50 for driving the electric motor 29 in response to electric power supplied from the battery 30 is contained in one of both of the side covers 48, and charge circuit means 51 for charging the battery 30 is contained in the other of both of the side covers 48.

Figure 5:
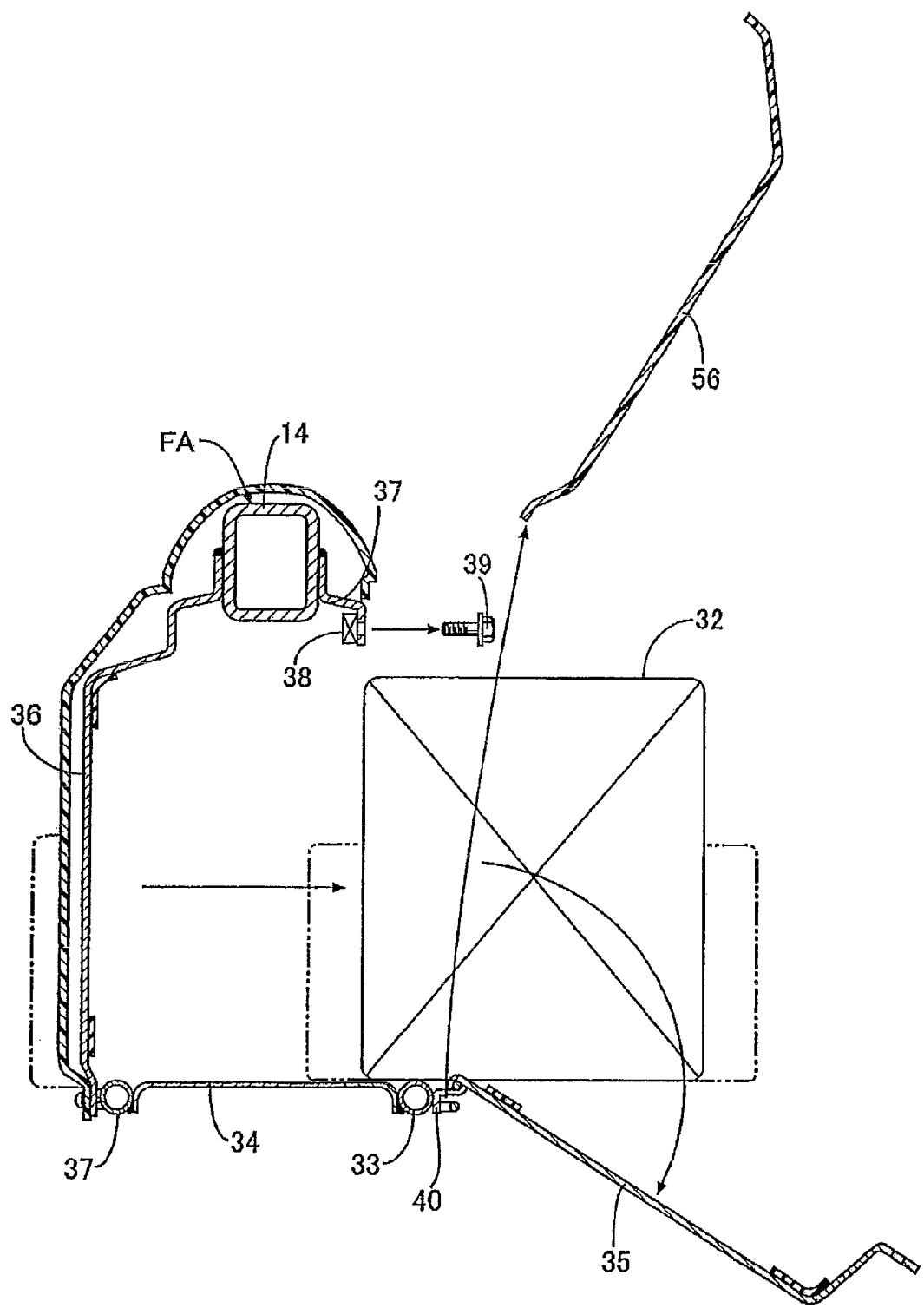
FIG. 5 is a cross sectional view corresponding to FIG. 4 in a state in which a lid is open and a battery box is drawn.

Part of the center cover 47 of the vehicle body cover 49 includes a lid 56 which is openable and closable and which covers the side of the battery box 32, for example, the left side. Multiple insert projections 56a provided to the lower portion of the lid 56 is, from above, inserted into support frames 57 provided to the lower frame 33 on the left. On the other hand, the lid 56 is attached to multiple portions of the vehicle body frame FA by use of clips 59 above the lower frame 33. By removing the clips 59 and drawing out the insert projections 56a from the support frames 57 upward, the lid 56 is capable of being removed as shown in FIG. 5.

Next, the operation of this first embodiment is explained. The battery 30 supplying electric power to the electric motor 29 which generates power for rotationally driving the rear wheel WR is disposed to the space S surrounded by the down frame 15 is coupled to the front end of the main frame 14 and extends downwardly, the pivot frames 16 is coupled to the rear end of the main frame 14 and extends downwardly, and the main frame 14. The electric motor 29 is disposed in a different position from the space S. Accordingly, since the space S is made large and the battery 30 is disposed to the large space S, the large battery 30 is capable of being disposed.

The front end of the swing arm 23 with a rear end that journals the rear wheel WR is vertically pivotally coupled to the pivot frames 16. The electric motor 29 is disposed to the rear end of the swing arm 23 while the rotation axis of the electric motor 29 is coaxial with the rear wheel WR. Accordingly, the electric motor 29 is capable of being disposed compactly while securing the disposition space for the battery 30.

The battery 30 is structured by coupling the multiple battery cells 31 to each other. The battery cells 31 are arranged in the battery box 32 which has the upper surface generally along the lower surface of the main frame 14 and which is surrounded by the main frame 14, the down frame 15, and the pivot frames 16, the battery cells 31 conforming to the shape of the battery box 32. More of the battery cells 31 are capable of being contained in the battery box 32.

In addition, the side covers 48 covering the seat rails 18 from the sides are disposed below the occupant seat 28 provided above the seat rails 18. The drive circuit means 50 for driving the electric motor 29 in response to electric power supplied from the battery 30 is contained in the side cover 48. Accordingly, the appearance is capable of being improved by making the drive circuit means 50 invisible from the outside.

Further, the pair of left and right side covers 48 is disposed to both left and right sides of the seat rails 18. The drive circuit means 50 is contained in one of both of the side covers 48. The charge circuit means 51 for charging the battery 30 is contained in the other of both of the side covers 48. Accordingly, while the weight balance between the left and right is made excellent, and the space in both of the side covers 48 is used efficiently to obtain an excellent appearance, the drive circuit means 50 and the charge circuit means 51 are capable of being disposed.

The steps 43 disposed to both sides of the battery 30 and the battery box 32 in planar view are provided to the front ends of the pair of left and right step frames 42 overlapping the rear portions of the battery 30 and the battery box 32 in a planar view. Accordingly, while preventing the width between both of the step frames 42 from widening, the foot rest capability for an occupant is capable of being improved.

In accordance with the disposition of both of the steps 43, the width of the battery 30 is forced to narrow in a portion where an occupant straddles the occupant seat 21. However, the width of a portion of the battery 30 disposed forward of both of the step frames 42 and both of the steps 43 is widened to increase a capacity of the battery box 32 to the utmost while improving the foot rest capability for an occupant. The battery 30 is capable of being made large by containing more battery cells 31 in the battery box 32.

The bottom surface 45 of the battery 30 is stepped down in a forward direction by including the rear bottom surface 45a disposed above the step frames 42 and the steps 43 in side view and the front bottom surface 45b disposed below the step frames 42 and the steps 43. Accordingly, while preventing the width between both of the step frames 42 from becoming large, downsizing of the battery 30 is avoidable. The battery 30 is capable of being drawn from the side without interfering with the step frames 42 and the steps 43. Thus, improving the maintainability of the battery 30.

In this case, the lid 56 covering the side of the battery box 32 is provided on the vehicle body cover 49 covering the battery box 32. The lid 56 may be opened and closed. Accordingly, as shown in FIG. 5, by opening the lid 56 and pivoting the support frame 35 downwardly, the battery box 32 is capable of being drawn from the side easily, thus, improving maintainability.

Figure 6:
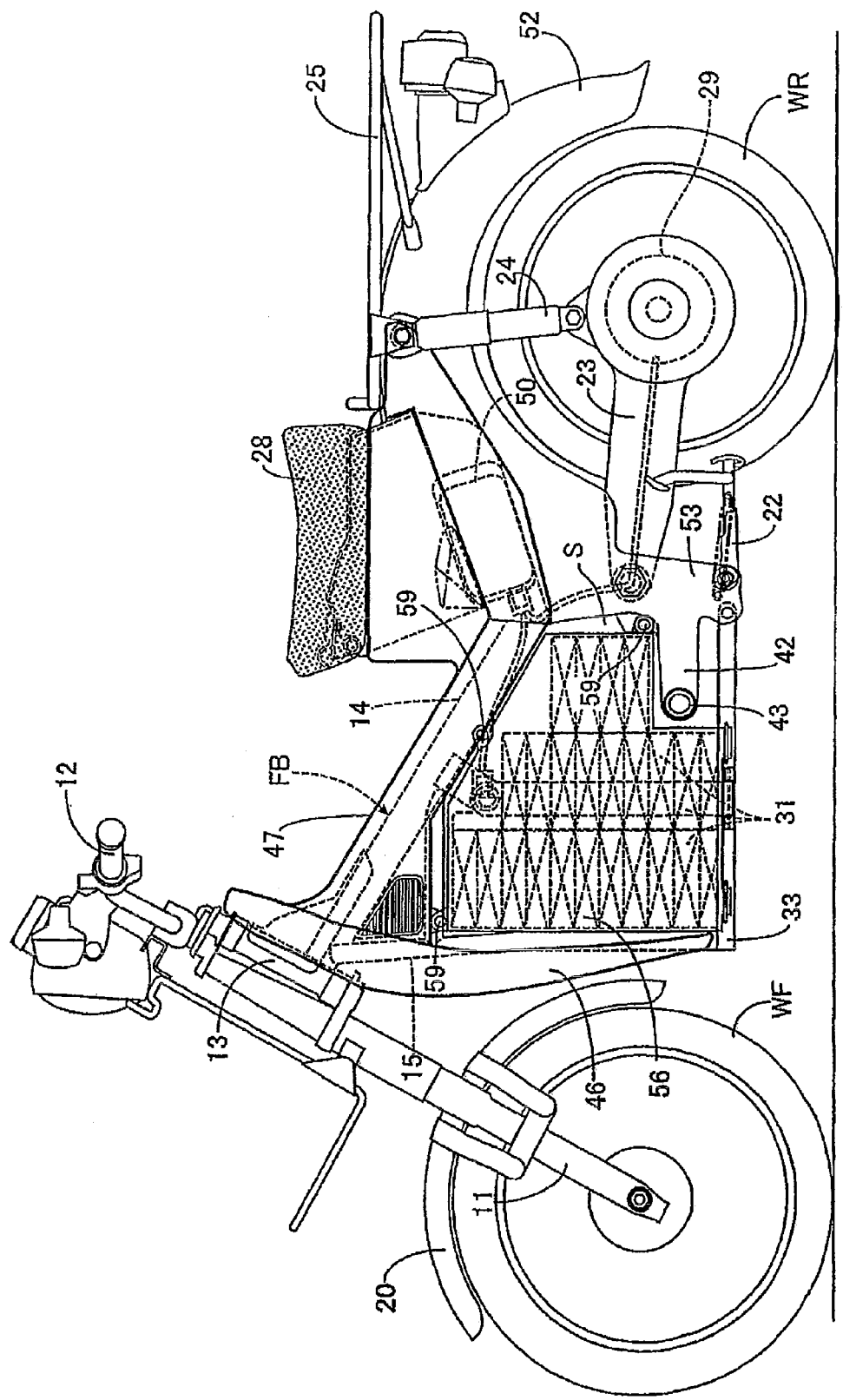
FIG. 6 is a left side view of a motorcycle of a second embodiment.

FIG. 6 shows a second embodiment of the present invention, in which parts corresponding to those in the first embodiment are given similar reference numerals and only illustrated, and not explained in detail.

A vehicle body frame FB of this motorcycle includes: a head pipe 13 steerably supporting a front fork 11 with a lower end that journals a front wheel WF and the steering handlebar 12. A main frame 14 includes a pipe shape and extends from the head pipe 13 rearwardly and downwardly. A rear frame 52 is capable of being divided into left and right and coupled to a lower part of the main frame 14. The rear frame 52 integrally includes pivot frames 53 coupled to a rear end of the main frame 14 and extends downwardly, and has a function of a rear fender covering seat rails supporting an occupant seat 28 and a rear wheel WR from above.

A pair of left and right step frames 42 extending forward from the pivot frames 53 are coupled to lower portions of the pivot frames 53. Steps 43 for resting the feet of an occupant seated on the occupant seat 28 are provided to front ends of the step frames 42.

The rear wheel WR is journaled to the rear portion of a swing arm 23 pivotally supported by the lower portions of the pivot frames 53. An electric motor 29 for generating power for rotationally driving the rear wheel WR is provided with a rotation axis of the electric motor 29 coaxial with the rear wheel WR.

A battery 30 for supplying electric power to the electric motor 29 is structured by coupling multiple battery cells 31 with each other and is contained in a battery box 32. The battery box 32 is disposed in a space S surrounded by the main frame 14, a down frame 15 coupled to the head pipe 13 or to the front end of the main frame 14 (in this embodiment, the front end of the main frame 14), and the pivot frames 53, as in the first embodiment. An upper surface of the battery box 32 is formed to be stepped down rearwardly along a lower surface of the main frame 14 extending rearwardly and downwardly.

As in the first embodiment, a lid 56 is provided to a vehicle body cover 55 having leg shields 46 and covering the battery box 32. The lid 56 may be opened and closed.

The same effect as the first embodiment is obtainable also in the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride type electric vehicle comprising:
   a head pipe steerably supporting a front fork with lower end for journaling a front wheel and a steering handlebar;
   a main frame extending from the head pipe rearwardly and downwardly; and
   an electric motor for generating power for rotationally driving a rear wheel, said electric motor being disposed in a different position from a space surrounded by a down frame which is coupled to the head pipe or to a front end of the main frame and which extends downwardly, pivot frames are coupled to a rear end of the main frame and extend downwardly, and the main frame;
   a battery for supplying electric power to the electric motor, said battery being disposed within the space (S);
   steps for resting feet of an occupant seated on an occupant seat are provided to front ends of a pair of left and right step frames which are coupled to lower portions of the pivot frames, the step frames extending forward and overlapping a rear portion of the battery in a planar view, the steps being disposed to both sides of the battery in the planar view;
   a bottom surface of the battery is stepped down forward, the bottom surface including a rear bottom surface disposed above the step frames and the steps in a side view and a front bottom surface disposed below the step frames and the steps between the steps and the down frame; and
   a vehicle body cover having a lid covering a lateral side of the battery box, the lid being openable and closable;
   wherein a plurality of battery cells coupled to each other to form the battery are arranged in a battery box which has an upper surface extending rearwardly and downwardly along the main frame and which is disposed in the space (S) surrounded by the main frame, the down frame, and the pivot frames, the battery cells conforming to a shape of the battery box.

2. The saddle-ride type electric vehicle according to claim 1, wherein a width of a portion of the battery disposed forward of both of the step frames and both of the steps is set larger than a width of a rear portion of the battery corresponding to both of the step frames and both of the steps.

3. The saddle-ride type electric vehicle according to claim 1, wherein the lid is removable from the vehicle body cover.

4. The saddle-ride type electric vehicle according to claim 1, and further including left and right support frames for supporting the battery and a stay secured to the main frame, an upper end of the left support frame being removably attached to said stay for securing the left support frame to the main frame.

5. The saddle-ride type electric vehicle according to claim 4, wherein a bolt connects the left support frame to the stay and loosening the bolt enables the left support frame to pivot downwardly.

6. The saddle-ride type electric vehicle according to claim 1, wherein the battery includes a first predetermined width in an area adjacent to the head pipe of the vehicle and the battery includes a second reduced width relative to the first predetermined width in the area adjacent to the steps.

7. The saddle-ride type electric vehicle according to claim 1, wherein the lid is secured to the vehicle body cover by clips.

8. The saddle-ride type electric vehicle according to claim 1, wherein the electric motor includes a rotational axis that is coaxial with the rear wheel.

9. The saddle-ride type electric vehicle according to claim 1, and further including a left support frame and a right support frame, said right support frame being directly connected to the main frame and extending downwardly therefrom, the left support frame being removably affixed to the main frame and a support plate being secured to lower frames for providing an enclosure for supporting the battery.

10. A saddle-ride type electric vehicle comprising:
    a head pipe;
    a main frame extending from the head pipe rearwardly and downwardly; and
    an electric motor for generating power for rotationally driving a rear wheel, said electric motor being positioned directly adjacent to the rear wheel;
    a space (S) being formed by a down frame coupled to the head pipe or to a front end of the main frame and which extends downwardly, pivot frames coupled to a rear end of the main frame and extend downwardly, and the main frame;
    a battery for supplying electric power to the electric motor, said battery being disposed within the space (S);
    steps for resting feet of an occupant seated on an occupant seat, said steps being provided to front ends of a pair of left and right step frames which are coupled to lower portions of the pivot frames, the step frames extending forward and overlapping a rear portion of the battery in a planar view, the steps being disposed to both sides of the battery in the planar view; and
    a vehicle body cover having a lid covering a lateral side of the battery box, the lid being openable and closable,
    said battery being wider in a forward position adjacent to the head pipe as compared to the width in an area adjacent to the step frames; wherein the battery includes a first predetermined width in an area adjacent to the head pipe of the vehicle and the battery includes a second reduced width relative to the first predetermined width in the area adjacent to the steps.

11. The saddle-ride type electric vehicle according to claim 10, wherein a plurality of battery cells coupled to each other to form the battery are arranged in a battery box which has an upper surface extending rearwardly and downwardly along the main frame and which is disposed in the space (S) surrounded by the main frame, the down frame, and the pivot frames, the battery cells conforming to a shape of the battery box.

12. The saddle-ride type electric vehicle according to claim 11, wherein a width of a portion of the battery disposed forward of both of the step frames and both of the steps is set larger than a width of a rear portion of the battery corresponding to both of the step frames and both of the steps.

13. The saddle-ride type electric vehicle according to claim 10, and further including left and right support frames for supporting the battery and a stay secured to the main frame, an upper end of the left support frame being removably attached to said stay for securing the left support frame to the main frame.

14. The saddle-ride type electric vehicle according to claim 13, wherein a bolt connects the left support frame to the stay and loosening the bolt enables the left support frame to pivot downwardly.

15. The saddle-ride type electric vehicle according to claim 10, wherein the lid is secured to the vehicle body cover by clips.

16. The saddle-ride type electric vehicle according to claim 10, wherein the electric motor includes a rotational axis that is coaxial with the rear wheel.

17. The saddle-ride type electric vehicle according to claim 10, and further including a left support frame and a right support frame, said right support frame being directly connected to the main frame and extending downwardly therefrom, the left support frame being removably affixed to the main frame and a support plate being secured to lower frames for providing an enclosure for supporting the battery.

18. A saddle-ride type electric vehicle comprising:
a head pipe steerably supporting a front fork with lower end for journaling a front wheel and a steering handlebar;
a main frame extending from the head pipe rearwardly and downwardly; and
an electric motor for generating power for rotationally driving a rear wheel, said electric motor being disposed in a different position from a space surrounded by a down frame which is coupled to the head pipe or to a front end of the main frame and which extends downwardly, pivot frames are coupled to a rear end of the main frame and extend downwardly, and the main frame;
a battery for supplying electric power to the electric motor, said battery being disposed within the space (S);
steps for resting feet of an occupant seated on an occupant seat are provided to front ends of a pair of left and right step frames which are coupled to lower portions of the pivot frames, the step frames extending forward and overlapping a rear portion of the battery in a planar view, the steps being disposed to both sides of the battery in the planar view;
a bottom surface of the battery is stepped down forward, the bottom surface including a rear bottom surface disposed above the step frames and the steps in a side view and a front bottom surface disposed below the step frames and the steps between the steps and the down frame;
left and right support frames for supporting the battery; and
a stay secured to the main frame,
an upper end of the left support frame being removably attached to said stay for securing the left support frame to the main frame.

* * * * *